(12) United States Patent
Figueroa

(10) Patent No.: US 6,530,204 B1
(45) Date of Patent: Mar. 11, 2003

(54) SYSTEM FOR REMOVING A STEM FROM FRUIT

(76) Inventor: Enrique S. Figueroa, 373 S. Dawson Dr., Unit 5 N, Camarillo, CA (US) 93010

( * ) Notice: Subject to any disclaimer, the term of this patent is extended or adjusted under 35 U.S.C. 154(b) by 32 days.

(21) Appl. No.: 09/815,709

(22) Filed: Mar. 23, 2001

(51) Int. Cl.⁷ .............................................. A01D 46/24
(52) U.S. Cl. ...................................................... 56/330
(58) Field of Search ........................ 56/1, 327.1, 328.1, 56/330, 329, 331–340; 83/56, 57, 856, 857, 875, 932; 99/642, 637

(56) References Cited

U.S. PATENT DOCUMENTS

| 462,386 A | 11/1891 | Reno et al. |
| 1,558,774 A | 10/1925 | Barnes |
| 3,595,001 A * | 7/1971 | Shumaker .................... 182/15 |
| D301,825 S | 6/1989 | Kilpelainen |
| 4,949,459 A | 8/1990 | Noble |
| 5,092,043 A | 3/1992 | Shirkey |
| 5,724,799 A * | 3/1998 | Hsia .............................. 56/339 |
| 5,857,316 A | 1/1999 | Murdock |
| 5,865,111 A * | 2/1999 | Hanson ........................ 99/637 |
| 6,286,407 B2 * | 9/2001 | Ortega et al. .................. 83/857 |

* cited by examiner

*Primary Examiner*—Robert E. Pezzuto

(57) ABSTRACT

A system for removing a stem from fruit more quickly and safely than conventional stem removing systems. The system for removing a stem from fruit includes a head member for separating the stem from the fruit and a stand for holding the head member above a surface. The head member includes a base plate, a back plate and a pair of lateral side plates coupled together. The base plate includes at least one hole extending through an upper and lower surface of the base plate and at least one cutting portion formed over the hole. The back plate is removably coupled to the stand. The fruit is removably engaged in the cutting portion such that the fruit stem is removed from the fruit.

19 Claims, 3 Drawing Sheets

SYSTEM FOR REMOVING A STEM FROM FRUIT

BACKGROUND OF THE INVENTION

1. Field of the Invention

The present invention relates to fruit stem removing systems and more particularly pertains to a new system for removing a stem from fruit more quickly and safely than conventional stem removing systems.

2. Description of the Prior Art

The use of fruit stem removing systems is known in the prior art. More specifically, fruit stem removing systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,857,316; 1,558,774; 4,949,459; 5,092,043; 462,386; and U.S. Pat. No. Des. 301,825.

While these devices fulfill their respective, particular objectives and requirements, the aforementioned patents do not disclose a new system for removing a stem from fruit. The inventive device includes a head member for separating the stem from the fruit and a stand for holding the head member above a surface. The head member includes a base plate, a back plate and a pair of lateral side plates coupled together. The base plate includes at least one hole extending through an upper and lower surface of the base plate and at least one cutting portion formed over the hole. The back plate is removably coupled to the stand. The fruit is removably engaged in the cutting portion such that the fruit stem is removed from the fruit.

In these respects, the system for removing a stem from fruit according to the present invention substantially departs from the conventional concepts and designs of the prior art, and in so doing provides an apparatus primarily developed for the purpose of removing the stem from strawberries more quickly and safely than conventional stem removing systems.

SUMMARY OF THE INVENTION

In view of the foregoing disadvantages inherent in the known types of fruit stem removing systems now present in the prior art, the present invention provides a new system for removing a stem from fruit construction wherein the same can be utilized for removing the stem from strawberries more quickly and safely than conventional stem removing systems.

The general purpose of the present invention, which will be described subsequently in greater detail, is to provide a new system for removing a stem from fruit apparatus and method which has many of the advantages of the fruit stem removing systems mentioned heretofore and many novel features that result in a new system for removing a stem from fruit which is not anticipated, rendered obvious, suggested, or even implied by any of the prior art fruit stem removing systems, either alone or in any combination thereof.

To attain this, the present invention generally comprises a head member for separating the stem from the fruit and a stand for holding the head member above a surface. The head member includes a base plate, a back plate and a pair of lateral side plates coupled together. The base plate includes at least one hole extending through an upper and lower surface of the base plate and at least one cutting portion formed over the hole. The back plate is removably coupled to the stand. The fruit is removably engaged in the cutting portion such that the fruit stem is removed from the fruit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new system for removing a stem from fruit apparatus and method which has many of the advantages of the fruit stem removing systems mentioned heretofore and many novel features that result in a new system for removing a stem from fruit which is not anticipated, rendered obvious, suggested, or even implied by any of the prior art fruit stem removing systems, either alone or in any combination thereof.

It is another object of the present invention to provide a new system for removing a stem from fruit which may be easily and efficiently manufactured and marketed.

It is a further object of the present invention to provide a new system for removing a stem from fruit which is of a durable and reliable construction.

An even further object of the present invention is to provide a new system for removing a stem from fruit which is susceptible of a low cost of manufacture with regard to both materials and labor, and which accordingly is then susceptible of low prices of sale to the consuming public, thereby making such system for removing a stem from fruit economically available to the buying public.

Still yet another object of the present invention is to provide a new system for removing a stem from fruit which provides in the apparatuses and methods of the prior art some of the advantages thereof, while simultaneously overcoming some of the disadvantages normally associated therewith.

Still another object of the present invention is to provide a new system for removing a stem from fruit for removing the stem from strawberries more quickly and safely than conventional stem removing systems.

Yet another object of the present invention is to provide a new system for removing a stem from fruit which includes a head member for separating the stem from the fruit and a stand for holding the head member above a surface. The head member includes a base plate, a back plate and a pair of lateral side plates coupled together. The base plate includes at least one hole extending through an upper and lower surface of the base plate and at least one cutting portion formed over the hole. The back plate is removably coupled to the stand. The fruit is removably engaged in the cutting portion such that the fruit stem is removed from the fruit.

Still yet another object of the present invention is to provide a new system for removing a stem from fruit that is more easily and quickly used than conventional fruit stem removing systems.

Even still another object of the present invention is to provide a new system for removing a stem from fruit that reduces the injuries sustained by users trying to remove a fruit stem by a knife or other cutting means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
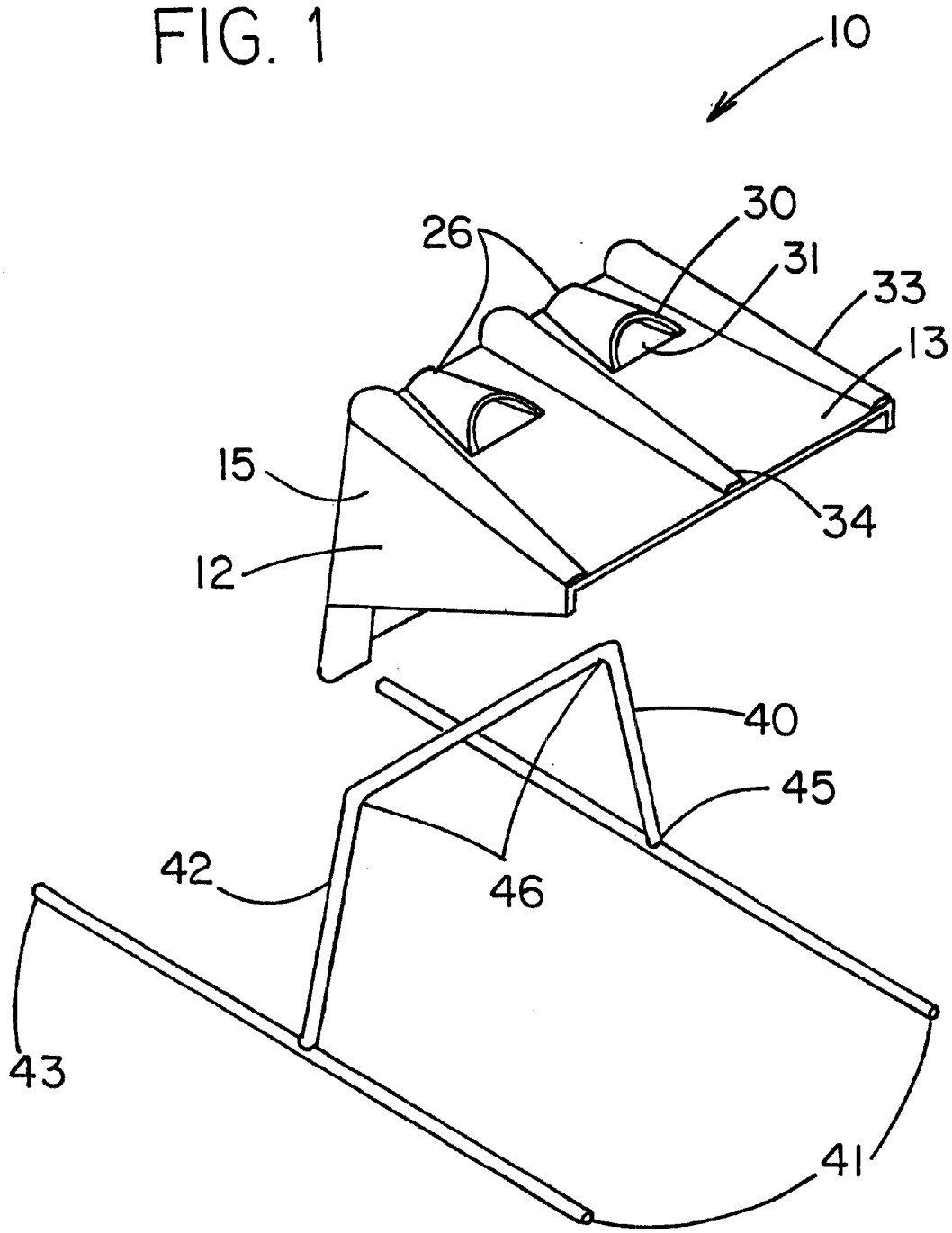
FIG. 1 is a schematic perspective view of a new system for removing a stem from fruit according to the present invention showing a head member mounted on a stand.

With reference now to the drawings, and in particular to FIGS. 1 through 4 thereof, a new system for removing a stem from fruit embodying the principles and concepts of the present invention and generally designated by the reference numeral 10 will be described.

As best illustrated in FIGS. 1 through 4, the system for removing a stem from fruit 10 generally comprises a head member 12 for separating the stem from the fruit and a stand 40 for supporting the head member 12 above a surface such as a ground surface or a kitchen counter surface.

The head member 12 includes a base plate 13, a back plate 14 and a pair of lateral side plates 15. The back 14 and lateral side 15 plates may extend substantially perpendicular from the base plate 13. The base plate 13 includes a pair of holes 16 extending through an upper 17 and lower 18 surface of the base plate 13. The back plate 14 preferably includes a pair of folded portions 20 formed thereon. Each of the folded portions 20 may extend from the base plate 13 toward an end 21 of the back plate 14. An edge 22 of each of the folded portions 20 defines a channel 23 extending into the folded portions 20.

The back plate 14 may include a hole 24 extending therethrough for carrying the head member 12. The hole 24 of the back plate 14 may be positioned generally adjacent to the base plate 13. The base plate 13 includes a pair of cutting portions 26 for cutting the stem from the strawberries. The present invention may employ one cutting portion 26 for cutting the stem from the strawberries. A width of each of the lateral side plates 15 may taper from the back plate 14 toward a perimeter edge 28 of the base plate 13. The base plate 13 also includes a plurality of guide rail portions 27 for guiding a user's hands away from the cutting portions 26 so that the user does not injure themselves while cutting the stems from the strawberries.

Each of the cutting portions 26 extends from the upper surface 17 of the base plate 13. Each of the cutting portions 16 preferably extends across one of the holes 16 in the base plate 13. Each of the cutting portions 16 preferably includes a generally arcuate shape with an edge 30 of each of the cutting portions 16 defining an opening 31 extending into the holes 16 through the base plate 13.

Figure 2:
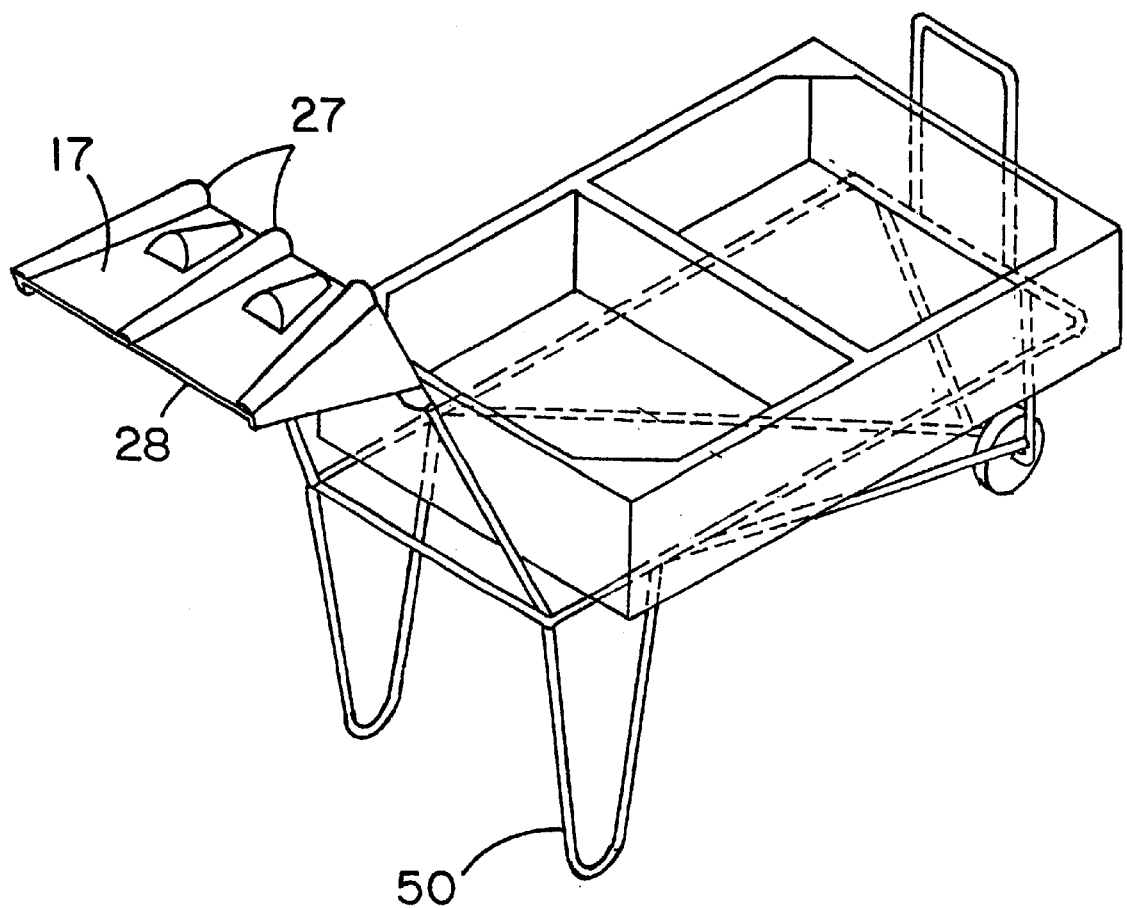
FIG. 2 is a schematic perspective view of the present invention showing the head member mounted on a cart.
Figure 3:
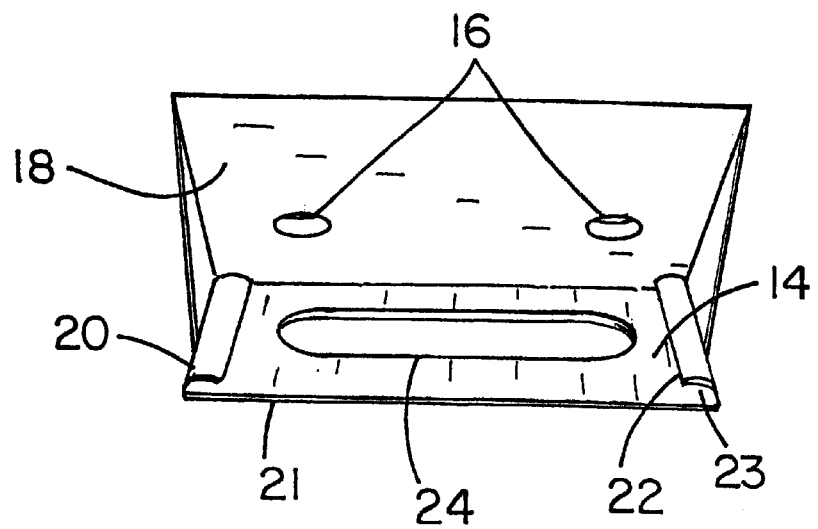
FIG. 3 is a schematic perspective view of the present invention.

In one embodiment of the present invention, as illustrated in FIGS. 1 and 2, each of the guide rail portions 27 extends from the upper surface 17 of the base plate 13 and extends between the back plate 14 and the perimeter edge 28. A height of each of the guide rail portions 27 may taper from the back plate 14 toward the perimeter edge 28. Each of a lateral pair 33 of the guide rail portions 27 are positioned generally adjacent to one of the lateral side plates 15 of the head member 12. A central guide rail 34 of the guide rail portions 27 is positioned generally between each of the cutting portions 26.

Figure 4:
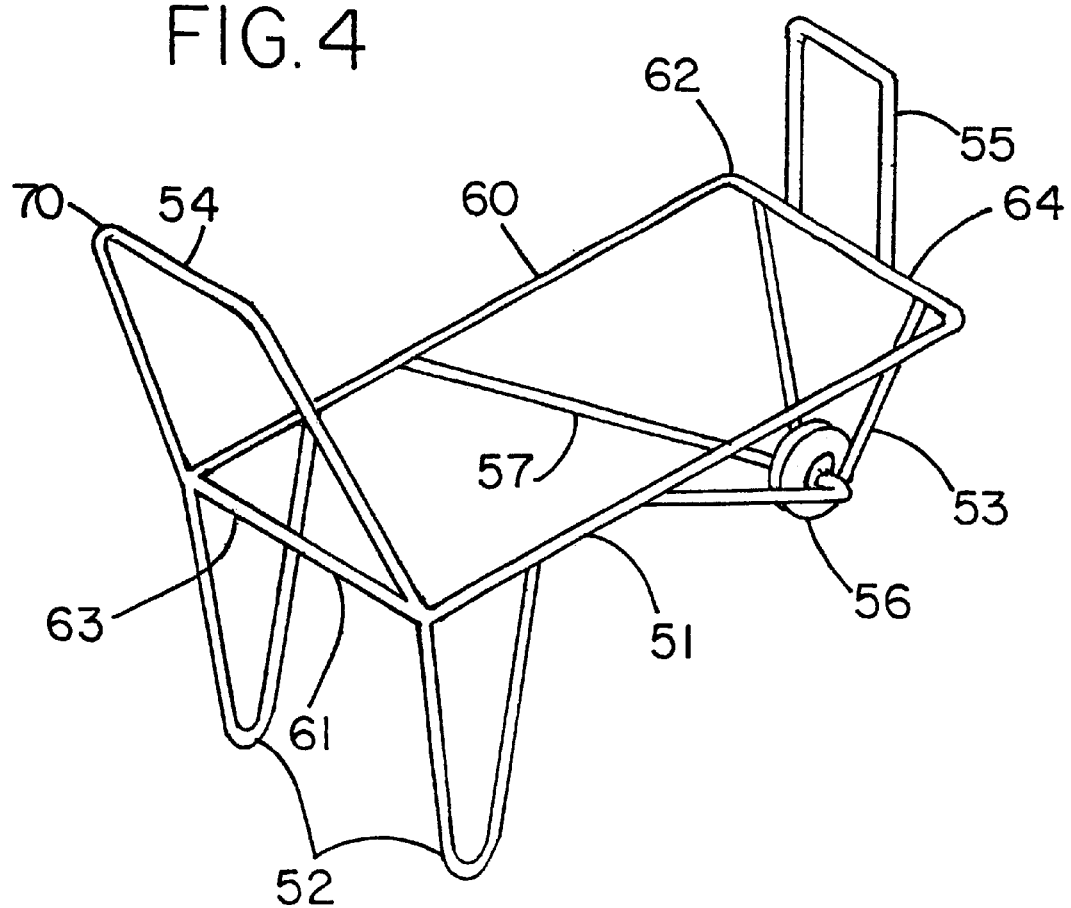
FIG. 4 is a schematic perspective view of the present invention showing the cart.

The stand 40 includes a pair of foot portions 41 and a connecting portion 42 for connecting each of the foot portions 41 together. In one embodiment of the present invention, as illustrated in FIG. 1, each of the foot portions 41 has a pair of opposite ends 43. Each of the foot portions 41 may be orientated generally parallel to each other to provide stability to the stand 40. The connecting portion 42 preferably has a pair of opposite ends 45 that are mounted on one of the foot portions 41. Each of the ends 45 of the connecting portion 42 may be positioned generally an equal distance from each of the ends 43 of the foot portions 41. The connecting portion 42 preferably includes a pair of bends 46. The connecting portion 42 is removably inserted in each of the channels 23 of the folded portions 20. and As illustrated in FIGS. 2 and 4, a cart 50 may be provided for carrying the fruit. The cart 50 may include a body portion 51, a pair of front leg portions 52, a rear leg portion 53, a neck portion 54 and a handle portion 55. A wheel 56 may be rotatably mounted on the rear leg portion 53 and a pair of support portions 57 may be provided for supporting the rear leg portion 53.

In one embodiment of the present invention, as particularly illustrated in FIG. 4, the body portion 51 has a pair of lateral rods 60 and a pair of end rods 61. Each of the end rods 61 extends between an end 62 of each of the lateral rods 60 such that the body portion 51 has a generally rectangular shape. Each of the front leg portions 52 extends from one of the lateral rods 60 and are positioned generally adjacent to a first 63 of the end rods.

The rear leg portion 53 may extend from a second 64 of the end rods 61. Each of the leg portions 52 and 53 includes a generally arcuate shape for providing structural support to the body portion 51. The wheel 56 is mounted on the rear leg portion. The handle portion 55 may extend from the second end rod 64 in a direction opposite the rear leg portion 53. The handle portion 55 is preferably positioned an equal distance from each of the lateral rods 60. The handle portion 55 may include a generally arcuate shape providing a user an easier means of carrying the cart 50.

The pair of support portions 57 is preferably coupled to and extending between the rear leg portion 53 and each of the lateral rods 60 of the body portion 51. A long axis of each of the support portions 57 intersects a long axis of the lateral side rods 60 and the rear leg portion 53.

The neck portion 54 preferably extends from the first end rod 63 in a direction opposite the front pair of leg portions 52. The neck portion 54 preferably includes a generally arcuate shape such that the head member 12 is removably mounted on the neck portion 54. An end 70 of the neck portion 54 is removably inserted in each of the channels 23 of the folded portion 20 of the head member 12.

In use, a user holds the fruit so that the stem is facing the base plate 13. The user guides the stem toward the edge 30 of the cutting portion 26. The cutting portion 26 cuts a channel in the fruit removing the stem and depositing it through the opening 31 in the cutting portion 26 and through the hole 16 in the base plate 13.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for removing a stem from fruit, said system comprising:
   a head member for separating the stem from the fruit, said head member having a base plate, a back plate and a pair of lateral side plates coupled together, said base plate having at least one hole extending through an upper and lower surface of said base plate, said base plate having at least one cutting portion formed thereon;
   wherein said cutting portion extends from said upper surface of said base plate and across said hole in said base plate and has a generally arcuate shape, an edge of each of said cutting portions defining an opening extending through said hole in said base plate, and
   wherein the fruit stem is removably engaged in said cutting portion.

2. The system for removing a stem of claim 1, additionally including a stand for supporting said head member above a surface, said stand including a pair of foot portions and a connecting portion for connecting each of said foot portions together, said back plate being removably coupled to said connecting portion.

3. The system for removing a stem of claim 2, wherein said back plate has a pair of folded portions formed thereon, each of said folded portions extending from said base plate toward an end of said back plate, an edge of each of said folded portions defines a channel extending therein, said connecting portion being removably inserted in each of said channels.

4. The system for removing a stem of claim 1, wherein said back plate has a hole extending therethrough, said hole being positioned generally adjacent to said base plate.

5. The system for removing a stem of claim 1, wherein said base plate has a plurality of guide rail portions formed thereon and extending between said back plate and a front portion of a perimeter edge of said base plate.

6. The system for removing a stem of claim 1, additionally including a cart for carrying the fruit, said cart having a body portion, a pair of front leg portions, a rear leg portion, a neck portion and a pair of support portions for supporting said rear leg portion, said head member being removably mounted on said neck portion.

7. The system for removing a stem of claim 5, wherein each of said guide rail portions extends from said upper surface of said base plate and extends a height of each of said guide rails tapering from said back plate toward said front portion of said perimeter edge.

8. The system for removing a stem of claim 7, wherein each of a lateral pair of said guide rail portions is positioned generally adjacent to one of said lateral side plates of said head member, said cutting portion being positioned generally between said lateral pair of guide rails.

9. The system for removing a stem of claim 2, wherein each of said foot portions has a pair of opposite ends, each of said foot portions being orientated generally parallel to each other, wherein said connecting portion has a pair of opposite ends, each of said ends of said connecting portion being mounted on one of said foot portions.

10. The system for removing a stem of claim 9, wherein said connecting portion has a pair of bends, each of said bends being removably inserted in one of said channels of said folded portions of said back plate.

11. The system for removing a stem of claim 6, additionally including a handle portion extending from a second end rod of said body portion, said handle portion having a generally arcuate shape.

12. The system for removing a stem of claim 6, wherein said body portion has a pair of lateral rods and a pair of end rods, each of said end rods extending between an end of each of said lateral rods such that said body portion has a generally rectangular shape.

13. The system for removing a stem of claim 12, wherein each of said front leg portions extends from one of said lateral rods, each of said front leg portions is positioned generally adjacent to a first of said end rods.

14. The system for removing a stem of claim 13, wherein said rear leg portion extends from a second of said end rods, each of said leg portions having a generally arcuate shape.

15. The system for removing a stem of claim 14, additionally including a wheel being mounted on said rear leg portion for moving said cart.

16. The system for removing a stem of claim 8, wherein said base plate has a pair of holes extending through an upper and lower surface of said base plate, said base plate having a pair of cutting portions formed thereon and positioned over each of said holes, a central guide rail of said guide rail portions is positioned generally between each of said cutting portions.

17. The system for removing a stem of claim 15, wherein said pair of support portions is coupled to and extends between said rear leg portion and each of said lateral rods of said body portion.

18. The system for removing a stem of claim 15, wherein said neck portion extends from said first end rod, said neck portion having a generally arcuate shape.

19. A system for removing a stem from a fruit, said system comprising:

a head member for separating the stem from the fruit, said head member having a base plate, a back plate and a pair of lateral side plates, said back and lateral side plates extending substantially perpendicular from said base plate, said base plate having a pair of holes extending through an upper and lower surface of said base plate, said back plate having a pair of folded portions formed thereon, each of said folded portions extending from said base plate toward an end of said back plate, an edge of each of said folded portions defining a channel extending therein, said back plate having a hole extending therethrough, said hole being positioned generally adjacent to said base wall, said base plate having a pair of cutting portions and a plurality of guide rail portions formed thereon, a width of each of said lateral side plates tapering from said back plate toward a front portion of said perimeter edge of said base plate;

wherein each of said cutting portions extends from said upper surface of said base plate, each of said cutting portions extending across one of said holes in said base plate, each of said cutting portions having a generally arcuate shape, an edge of each of said cutting portions defining an opening through said base plate;

wherein each of said guide rail portions extends from said upper surface of said base plate and extends between said back plate and said front portion of said perimeter edge, a height of each of said guide rails tapering from said back plate toward said front portion of said perimeter edge, each of a lateral pair of said guide rail portions being positioned generally adjacent to one of said lateral side plates of said head member, a central guide rail of said guide rail portions is positioned generally between each of said cutting portions;

a stand for supporting said head member above a surface, said stand including a pair of foot portions and a connecting portion for connecting each of said foot portions together;

wherein each of said foot portions has a pair of opposite ends, each of said foot portions being orientated generally parallel to each other;

wherein said connecting portion has a pair of opposite ends, each of said ends of said connecting portion being mounted on one of said foot portions, each of said ends of said connecting portion being positioned generally an equal distance from each of said ends of said foot portion, said connecting portion having a pair of bends, wherein said connecting portion is removably inserted in each of said channels of said folded portions; and wherein the fruit is held so that the stem is facing the base plate, a user guides the stem toward the edge of the cutting portion wherein the cutting portion removes the stem from the fruit;

a cart for carrying the fruit, said cart having a body portion, a pair of front leg portions, a rear leg portion, a neck portion and a handle portion, a wheel being rotatably mounted on said rear leg portion and a pair of support portions for supporting said rear leg portion;

wherein said body portion has a pair of lateral rods and a pair of end rods, each of said end rods extending between an end of each of said lateral rods such that said body portion has a generally rectangular shape;

wherein each of said front leg portions extends from one of said lateral rods, each of said front leg portions is positioned generally adjacent to a first of said end rods;

wherein said rear leg portion extends from a second of said end rods, each of said leg portions having a generally arcuate shape, said wheel being mounted on said rear leg portion;

wherein said handle portion extends from second end rod, said handle portion being positioned an equal distance from said lateral rods, said handle portion having a generally arcuate shape;

wherein said pair of support portions is coupled to and extends between said rear leg portion and each of said lateral rods of said body portion, a long axis of each of said support portions intersecting a long axis of said lateral side rods and said rear leg portion; and wherein said neck portion extends from said first end rod, said neck portion having a generally arcuate shape, said head member being removably mounted on said neck portion, an end of said neck portion being removably inserted in each of said channels of said folded portion of said head member.

* * * * *